United States Patent [19]

Sugiura

[11] Patent Number: 4,666,854

[45] Date of Patent: May 19, 1987

[54] APPARATUS FOR PRODUCING COMPOST

[76] Inventor: Eiichi Sugiura, 149, Matsumotocho, Hekinan-shi, Aichi, Japan

[21] Appl. No.: 697,771

[22] Filed: Feb. 4, 1985

[30] Foreign Application Priority Data

Feb. 2, 1984 [JP] Japan .................................. 59-17545

[51] Int. Cl.⁴ ........................... C12M 1/04; B01J 1/00
[52] U.S. Cl. .................................... 435/313; 435/289; 422/184
[58] Field of Search ............... 435/289, 287, 309, 801, 435/818, 313; 71/7, 9; 422/62, 110, 111, 184

[56] References Cited

U.S. PATENT DOCUMENTS 1,832,179 11/1931 Boggiano-Pico ................... 435/313
4,230,676 10/1980 Taylor et al. ................... 435/289 X
4,253,798 3/1981 Sugiura .......................... 415/213 R
4,436,817 3/1984 Nemetz .............................. 435/313
4,521,517 6/1985 Gauthier ............................ 435/313

Primary Examiner—Larry Jones
Attorney, Agent, or Firm—Bruce L. Adams; Robert E. Burns; Emmanuel J. Lobato

[57] ABSTRACT

Disclosed is a compost producing apparatus in which materials used for compost such as straws, fallen leaves, dungs, etc., are piled and rotted to produce the compost. In this apparatus, a liquid and air are mixed and agitated together so as to obtain the liquid containing minute air bubbles, and then the liquid is supplied to the materials so as to feed the material with water content as well as oxygen, to thereby promote propagation of organic substances to produce the compost uniformly ripened in a short time.

15 Claims, 2 Drawing Figures the compost. Thus, the propagation of organic substances is accelerated to thereby realize the uniform ripening of the compost in a short time. In a preferred embodiment of the present invention, a pressure regulation valve is provided in the midway of a return pipe so as to control the pressure of the liquid containing air bubbles to be supplied to injection pipes by regulating the valve. It is preferable that the used pump is of the centrifugal type, and, for example, pumps produced as NPH series by GEAR'S KOGYO K.K., Nishio-shi, Aichi-ken, Japan, are available suitably as such a centrifugal pump.

The foregoing and other objects, features and effects of the present invention will be apparent from the following detailed description directed to an embodiment in connection with the accompanying drawings.

APPARATUS FOR PRODUCING COMPOST

BACKGROUND OF THE INVENTION

The present invention generally relates to the art of making compost produced by piling and fermenting materials used for the compost, such as straws, fallen leaves, dungs, etc., and more particularly to an apparatus for obtaining the compost ripened uniformly in a short time.

It is widely known that materials used for the compost, such as straws, fallen leaves, vegetable scraps, sawdusts, dungs, etc., are piled for a predetermined period of time so that the materials are fermented into the state adapted to be used as manure. It is also widely known that such compost is superior as materials for corroding soil in farms. In order to make such compost as described above, it is necessary to pile the materials for a long time, and if the materials are not agitated in the meanwhile a plurality of times at a suitable interval, entirely uniform fermentation can not be obtained, but there are generated a sufficiently fermented portion as well as an insufficiently fermented portion. Even if the agitation of the materials is performed considerable times during the fermenting period, it is impossible to obtain uniformly ripened compost.

SUMMARY OF THE INVENTION

An object of the present invention is to provide an apparatus for producing compost by which uniformly ripened compost can be obtained in a short time.

Another object of the present invention is to provide an apparatus for producing compost by which uniformly ripened compost can be obtained even if the number of times of agitation of materials used for compost is reduced during the period of fermenting the materials.

The present invention is featured in that water as well as oxygen are supplied into the materials used for compost so as to accelerate the propagation of organic substances, thereby obtaining compost which is uniformly ripened in a short time.

According to the present invention, there is provided a compost producing apparatus comprising a device for supplying air into a liquid including a tank for reserving or storing the liquid, a pump having an inlet and an outlet, a suction pipe for feeding the liquid from the tank to the inlet of the pump, a return pipe for returning the liquid from the outlet of the pump to the tank, and air intake means disposed at the suction pipe for introducing atmospheric air into the suction pipe in a regulated manner, a plurality of injection pipes extending through piled material, each of the injection pipes having a plurality of injection nozzles on its peripheral surface, and joint means disposed at the outlet of the pump for dividing the pressurized liquid produced by the pump into the injection pipes and into the return pipe. In a preferred embodiment, the device is further provided with a regulator valve disposed in the return pipe for controlling the pressure of the liquid flowing through the injection pipes by regulating the returning rate of the liquid circulated to the return pipe.

The apparatus for producing compost according to the present invention is arranged such that atmospheric air is dispersed in the form of minute air bubbles into a liquid supplied to the piled materials used for compost, so that oxygen in the air bubbles is supplied together with the water content of the liquid into the materials

DESCRIPTION OF THE PREFERRED EMBODIMENT

Figure 1:
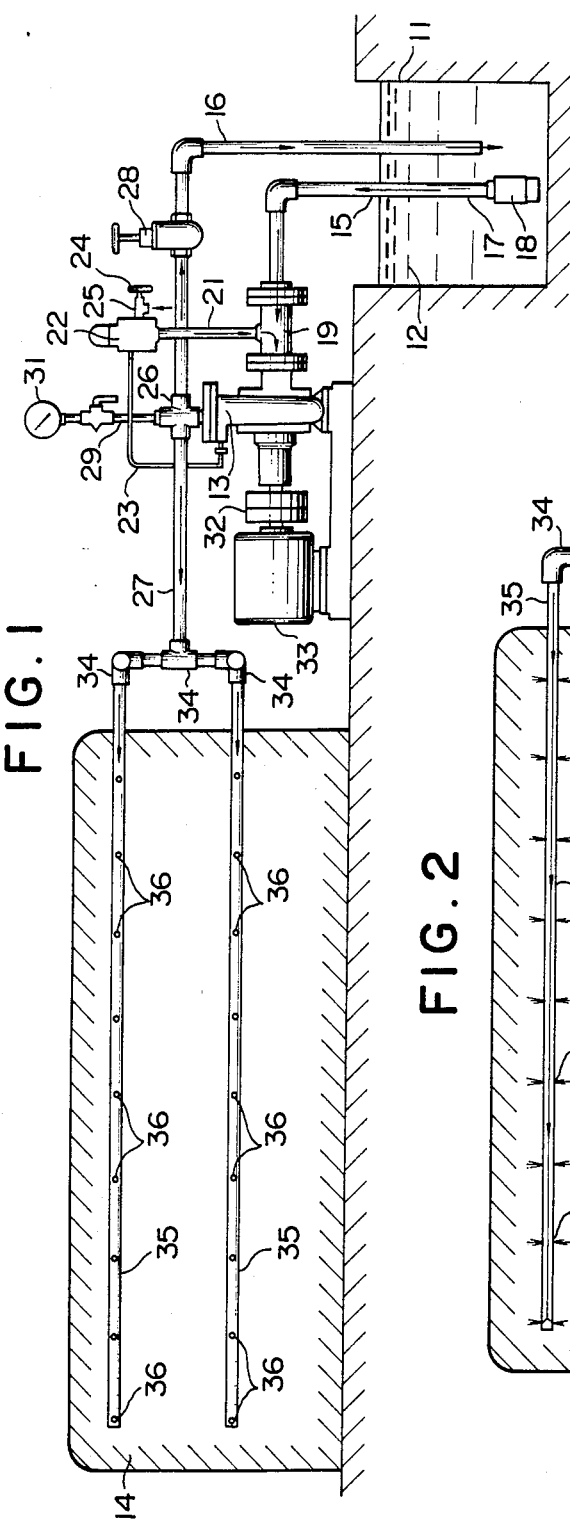
FIG. 1 is a side view, partly in section, showing an embodiment of the compost producing apparatus according to the present invention.
Figure 2:
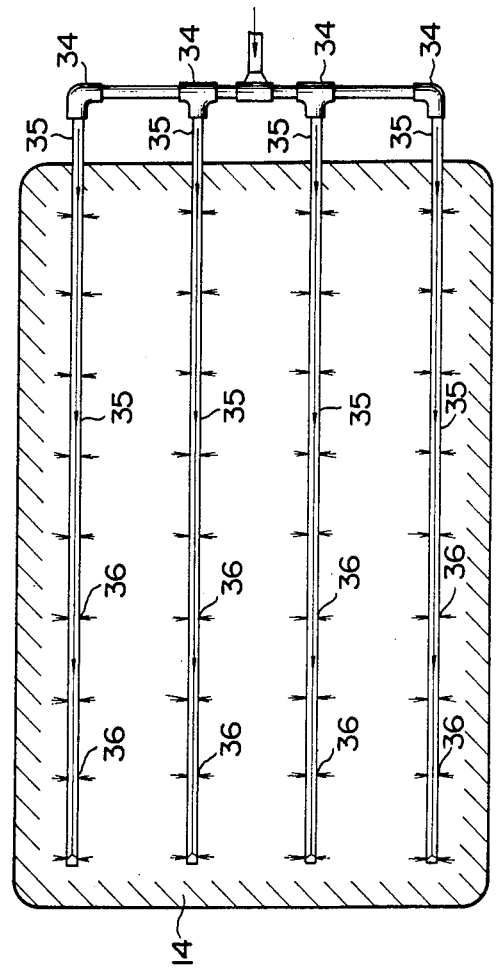
FIG. 2 is a plan view showing the positioning relation between the materials used for compost and the injection pipes shown in FIG. 1.

Referring to FIG. 1, a liquid 12 in a tank 11 is distributed to compost 14 by a pump 13. The pump 13 is disposed outside the tank 11 and connected to a suction pipe or pass 15 and a discharge or return pipe or pass 16 each communicating with the tank 11. A check valve 18 is provided at an inlet end 17 of the suction pipe 15. The suction side or inlet of the pump 13 is connected to the suction pipe 15 through a joint 19. The joint 19 is also connected to one end of an air supply pipe 21 so as to supply also air into the pump 13. The other end of the air supply pipe 21 is connected to an air intake valve 22. The air intake valve 22 is provided with a pressure sensing pipe 23 connected to the discharge side or outlet of the pump 13 so as to regulate the quantity of air being sucked at the suction side or inlet of the pump 13 in accordance with the discharge pressure of the pump 13. The air intake valve 22 is also provided with an air cock 25 having a handle 24 for regulating the quantity of air being sucked. With regard to the detailed structures of the air intake valve 22 and the air cock 25, reference is made to U.S. Pat. No. 4,290,979 filed by the same inventor as that of the present application and issued Sept. 22, 1981. The discharge side or outlet of the pump 13 is connected to a supply pipe 27 as well as the discharge or return pipe 16 through a joint 26. A regulation or regulator valve 28 is disposed in the discharge pipe 16, so that the pressure of the liquid containing air to be supplied to the supply pipe 27 is regulated by the regulation valve 28. The joint 26 is also connected to a pressure guage 31 through a connecting pipe 29.

The pipe 13 is connected to an electric motor 33 through a coupling 32. In a preferred embodiment of the present invention, a centrifugal pump is used as the pump 13. According to the conventional theory as to such a centrifugal pump, it is recognized that the efficiency of a centrifugal pump is greatly reduced if air is contained in the water being pumped. This is because the air expands in an impeller to block the inlets of blades to thereby cause a phenomenon similar to cavitation. However, it is also known that a certain kind of centrifugal pump having an improved blade structure may be used for a liquid containing a relatively large quantity of air without any practical difficulties. As an example of such a centrifugal pump, those produced as NPH series by GEAR'S KOGYO K.K. having its head office at Nishio-shi, Aichi-ken, Japan, may be available. The detail of the centrifugal pump structure of this series is disclosed in U.S. Pat. No. 4,253,798 filed by the same inventor as that of this application and issued Mar. 3, 1981. Also other types of pumps may be used.

The supply pipe 27 is connected to a plurality of injection pipes 35 through a plurality of joints 34 respectively. A plurality of injection nozzles 36 are formed at a predetermined interval in the peripheral surface of each of the injection pipes 35, the forward end of each of the injection pipes 35 being closed. The injection pipes 35 are disposed in two levels vertically separated at a predetermined interval in the compost 14, each level including the four injection pipes 35 disposed in a plane and separated from each other in a predetermined interval. The number of the levels of the injection pipes 35 as well as the number of the injection pipes 35 included in each level is not limited to those of this embodiment, but may be chosen in accordance with the height and area dimension of the piled compost. The liquid 12 may be plain water, or, alternatively, may be water containing a fermentation promoting agent.

Upon starting the motor 33 to rotate the pump 13, the liquid 12 in the tank 11 is sucked into the pump 13 through the check valve 18 and the suction pipe 15. After a water pumping-up operation is started and the pressure at the discharge side of the pump 13 exceeds a setting pressure value of the air intake valve 22, the air intake valve 22 is automatically opened to take the air so that the air drawn from the air cock 25 due to a negative pressure produced in the joint 19 is violently mixed and agitated with the liquid sucked through the suction pipe 15 within the pump 13, thereby generating a large quantity of minute air bubbles in the water to be supplied to the supply pipe 27. Thus, the pressurized liquid containing such minute air bubbles is fed through the injection pipes 35 and injected through the injection nozzles 36 into the inside of the piled compost 14 which is being ripened.

In this case, it is more efficient to use the pump 13 of the type having a discharge capacity larger than the injection quantity consumed at the injection nozzles 36 and having a high water head. This is because the injection pressure can be easily regulated by the regulation valve 28 disposed in the discharge pipe 16. In addition, by regulating the return rate of the liquid by the regulation valve 28, the mixture rate of the air, particularly the mixture rate of the atomized air, becomes higher as the quantity of liquid divided by the joint 26 and circulated into the discharge or return pipe 16 is made larger. It is of course that the larger air bubble particles contained in the circulated air-liquid mixture tend to more rapidly drift in the liquid and disappear. However, it takes about 2 minutes for the atomized air bubble particles floating or suspended in the liquid to drift upward for one meter, so that clear water becomes milk-white state and is mixed again with air in the pump 13 during the circulation to provide the liquid having accumulated air bubbles and a higher air-mixing ratio which is injected into the compost 14 being ripened.

An experiment has been made to produce the compost by using rice straws, reeds, grass with thick stalks, etc., which have been made dried, and added with a small quantity of dried dungs of cows, pigs, or the like, mixed therein, as the materials for the compost. When the materials have been only piled and agitated at a predetermined interval of days to produce the compost in the conventional way, ten months from October to the next August have been passed, and the reeds still include unripened portions in spite of having performed agitation about 4–5 times. On the contrary, in the case where the compost producing apparatus according to the present invention is used, the experiment has started on February and completely ripened compost has been obtained on August after a lapse of time of seven months. Meanwhile, agitation to exchange upper dried portions with lower wet portions has been performed once, and liquid mixed with atomized air of about 20% has been supplied about 2-5 times a month with normally injection pressure of 1-2 $kg/cm^2$. The reeds, or the like, have been sufficiently ripened, and the rice straws have been entirely ripened even if they have been thrown into in the bundled state, which would be otherwise found almost in the original state in the case of conventional method.

Although description has been made as to the specific embodiment according to the present invention it will become apparent to those skilled in the art that various changes in the shape and arrangement of parts may be made without departing from the spirit of the present invention or scope of the subjointed claims.

What is claimed is:

1. A compost producing apparatus comprising: a device for supplying atmospheric air into a liquid including a tank for reserving the liquid, a pump having an inlet and an outlet, a suction pipe connected to feed the liquid from the tank to the inlet of the pump, a return pipe for returning the liquid from the outlet of the pump to the tank, and air intake means disposed at the suction pipe for introducing a regulated amount of atmospheric air into the suction pipe, the pump being operative to mix and agitate the liquid with atmospheric air to produce pressurized liquid containing minute air bubbles at the outlet so that the device circulates the liquid containing the minute air bubbles therethrough to accumulate the minute air bubbles in the liquid to an extent such that the liquid at least at the outlet of the pump becomes substantially milk-white color; joint means disposed at the outlet of the pump for dividing the pressurized liquid containing the accumulated minute air bubbles from the device, the return pipe being connected to the joint means for returning a part of the divided pressurized liquid to the tank; and a plurality of injection pipes connected to the joint means for receiving a certain amount of the pressured liquid, and extending through a piled material to be composted, the injection pipes having a plurality of injection nozzles on a peripheral surface thereof for injecting the pressurized liquid into the piled material to compost the same.

2. A compost producing apparatus according to claim 1; wherein the pump has means for producing the minute air bubbles in a range of sizes such that it takes at least about two minutes for the minute air bubbles floating in the liquid to drift upward a distance of one meter.

3. A compost producing apparatus according to claim 1; wherein the device further includes a regulator valve disposed in the return pipe for controlling the pressure of the liquid flowing through the injection pipes by regulating the return rate of the liquid.

4. A compost producing apparatus according to claim 3; wherein the pump has means for producing the minute air bubbles in a range of sizes such that it takes at least about two minutes for the minute air bubbles floating in the liquid to drift upward a distance of one meter.

5. A compost producing apparatus according to claim 3; wherein the device produces the liquid injected to the piled material, containing about 20% by volume of the minute air bubbles in a range of sizes such that it takes at least about two minutes for the minute air bubbles floating in the liquid to drift upward a distance of one meter.

6. A composting apparatus for supplying a liquid containing air to a piled material comprising: circulation means for circulating a liquid including a tank for storing the liquid, a suction pass connected to the tank for drawing the liquid from the tank, a return pass connected to the tank for returning the liquid to the tank, air intake means for introducing the air into the circulated liquid, and a pump having an inlet connected to both the suction pass and the air inlet means and an outlet connected to the return pass, the pump being operative to mix and agitate the liquid with the air to produce a pressurized liquid containing minute air bubbles at the outlet so that the liquid containing the minute air bubbles is circulated through the circulation means to accumulate the minute air bubbles therein; dividing means connected to the outlet of the pump for dividing a certain amount of the circulated and pressurized liquid containing the accumulated minute air bubbles from the circulation means the return pass being connected to the dividing means and the tank for returning some of the liquid to the tank; and injection means connected to the dividing means and inserted into the piled material for supplying the liquid containing the minute air bubbles thereto.

7. A composting apparatus according to claim 6; wherein the circulation means includes a regulator valve interposed in the return pass for regulating the pressure of the circulated liquid so as to determine the return rate of the circulated liquid.

8. A composting apparatus according to claim 6; wherein the air intake means is disposed at the suction pass.

9. A composting apparatus according to claim 8; wherein the air intake means comprises an air intake valve for introducing atmospheric air into the liquid due to a negative pressure produced by the pump in the suction pass.

10. A composting apparatus according to claim 9; wherein the air intake means further includes a pressure sensing pipe connected between the outlet of the pump and the air intake valve for controlling the amount of air introduced into the liquid.

11. A composting apparatus according to claim 10; wherein the pressure sensing pipe has means for controlling the amount of air so as to enable the pump to produce the pressurized liquid containing 20% by volume of minute air bubbles therein.

12. A composting apparatus according to claim 6; wherein the pump comprises a centrifugal pump.

13. A composting apparatus according to claim 6; wherein the pump has means for producing the pressurized liquid containing therein minute air bubbles the size of which is such that it takes at least about two minutes for the minute air bubbles floating in the liquid to drift upward for a distance of one meter.

14. A composting apparatus according to claim 6; wherein the injection means comprises a plurality of injection pipes divided from the dividing means.

15. A composting apparatus according to claim 14; wherein each of the injection pipes includes a closed end portion and a plurality of nozzles thereon for injecting the liquid containing minute air bubbles.

* * * * *